United States Patent
Ripp (10) Patent No.: US 9,860,356 B2
(45) Date of Patent: Jan. 2, 2018

(54) METHOD FOR UPDATING SOFTWARE OF A MEASURING DEVICE, SMART COMPUTER AND COMPUTER READABLE PROGRAM PRODUCT

(71) Applicant: Rohde & Schwarz GmbH & Co. KG, Munich (DE)

(72) Inventor: Harald Ripp, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 14/340,354

(22) Filed: Jul. 24, 2014

(65) Prior Publication Data
US 2016/0028872 A1    Jan. 28, 2016

(51) Int. Cl.
| | |
|---|---|
| H04M 3/00 | (2006.01) |
| H04M 1/725 | (2006.01) |
| H04W 76/02 | (2009.01) |
| H04W 76/04 | (2009.01) |
| G06F 9/445 | (2006.01) |

(52) U.S. Cl.
CPC .......... *H04M 1/72525* (2013.01); *G06F 8/65* (2013.01); *H04W 76/023* (2013.01); *H04W 76/048* (2013.01)

(58) Field of Classification Search
CPC .................................................. H04W 8/245
USPC ....................................................... 455/418
See application file for complete search history.

(56) References Cited

U.S. PATENT DOCUMENTS

| | | | |
|---|---|---|---|
| 7,627,657 B1* | 12/2009 | Sargologos | 709/221 |
| 2004/0029566 A1* | 2/2004 | Cunningham et al. | 455/412.1 |
| 2004/0203693 A1* | 10/2004 | Mehta et al. | 455/419 |
| 2005/0240960 A1* | 10/2005 | Nagtzaam | 725/28 |
| 2012/0079100 A1* | 3/2012 | McIntyre et al. | 709/224 |
| 2013/0157637 A1* | 6/2013 | Bos | 455/418 |
| 2014/0137092 A1* | 5/2014 | Ueda et al. | 717/168 |
| 2014/0215450 A1* | 7/2014 | Salisbury et al. | 717/170 |
| 2014/0272771 A1* | 9/2014 | Boutoussov et al. | 433/29 |
| 2014/0374475 A1* | 12/2014 | Kallfelz et al. | 235/375 |
| 2015/0050893 A1* | 2/2015 | Nickel | G01N 3/56 455/67.14 |

FOREIGN PATENT DOCUMENTS

DE    3825160 A1    1/1990

* cited by examiner

*Primary Examiner* — Santiago Garcia
(74) *Attorney, Agent, or Firm* — Jenkins, Wilson, Taylor & Hunt, P.A.

(57) ABSTRACT

The present invention relates to a method for updating software of a measuring device in a RF sensitive environment is provided, the method comprising: providing a smart computer having a radio operation mode for wireless communication and providing a measuring device that is RF sensitive and that comprises software for the operation of the measuring device; downloading software update data from a software server by wireless coupling the smart computer to the software server via the Internet; decoupling the smart computer from the Internet after the software update data is downloaded; updating the software of the measuring device by directly connecting the smart computer to the measuring device and by uploading the software update data from the smart computer to the connected measuring device. The present invention also relates to a smart computer and to a computer readable program product.

20 Claims, 4 Drawing Sheets

METHOD FOR UPDATING SOFTWARE OF A MEASURING DEVICE, SMART COMPUTER AND COMPUTER READABLE PROGRAM PRODUCT

FIELD OF THE INVENTION

The present invention relates to a method for updating software in a RF sensitive environment. The present invention also relates to a smart computer and to a computer readable program product.

BACKGROUND OF THE INVENTION

Measuring devices—also denoted as measuring instruments or measuring apparatus—are used to determine geometric or physical quantities. It is essential that the parameter to be measured by the measuring device may not be distorted by its operation. For this reason, it must be ensured in terms of the measurement quality that noise or interference signals are avoided as possible.

The present invention particularly relates to such measuring devices which are operated in a RF-sensitive environment or which are designed to measure RF sensitive parameters. Such RF-sensitive measuring devices for measuring radio-frequency (RF) signals are, for example, described in DE 38 25 160 C2.

Modern measuring devices are typically controlled by microprocessors which operate using appropriate system software. Usually, this system software must be updated or upgraded from time to time. Common reasons for updating the software include fixing bugs or adding features to the device. The update or upgrade should preferably take place during operation of the measuring device or at least without dismounting the measuring device specially for the update. For the process of updating, there are several options available:

The most convenient way of updating is performed by connecting the measuring device via a specially designated wireless or wired web interface and by downloading the data that are required. Frequently, such a web interface is not available, for example, in order to prevent infection of the measuring device with malware, spam data, viruses, etc. In the case of an RF sensitive environment, any radio operation should be avoided, so that an update by means of a wireless web interface is ruled out.

For this reason, modern RF-sensitive measuring devices that are operated in an RF-sensitive environment, are either updated by removing the RF-sensitive device from the RF-sensitive environment and then perform the update in another non-RF-sensitive environment. This is very time-consuming and especially not always practical, if for example the installation and consequently de-installation of the measuring devices is very complex. Alternatively, it would also be conceivable that the updated system software is downloaded from the Internet by means of a computer that is set up in a non-RF-sensitive environment. This updated system software is then stored on a data carrier (e.g. USB stick, CD, etc.) and then uploaded from there to the measuring devices. However, this is also not much convenient and additionally time-consuming.

Consequently, there is a need to find a more comfortable, but nevertheless failsafe possibility for the updating of RF sensitive measuring devices.

SUMMARY OF THE INVENTION

The present invention provides methods for updating software of a measuring device in a RF sensitive environment, a smart computer and a computer readable program product.

Specifically, according to a first aspect of the invention, a method for updating software of a measuring device in a RF sensitive environment is provided, the method comprising: providing a smart computer having a radio operation mode for wireless communication and providing a measuring device that is RF sensitive and that comprises software for the operation of the measuring device; downloading software update data from a software server by wireless coupling the smart computer to the software server via the Internet; decoupling the smart computer from the Internet after the software update data is downloaded; updating the software of the measuring device by directly connecting the smart computer to the measuring device and by uploading the software update data from the smart computer to the connected measuring device.

According to a second aspect of the invention, a method for updating software of a RF-sensitive measuring device is provided, the method comprising: providing a smart computer and providing a measuring device that is RF sensitive and that comprises software for the operation of the measuring device; providing software update data to the smart computer; connecting the smart computer to the measuring device by means of a wired connection; updating the software of the measuring device by uploading the software update data from the smart computer to the connected measuring device.

According to a third aspect of the invention, a smart computer is provided, the smart computer comprising: a radio module for wireless communication; a wired interface and a wireless interface; a memory; a programmable circuit which is operable in a radio operation mode and an update mode and which is configured to: after activating the radio operation mode, connecting the smart computer to a software server via the radio module and via the wireless interface, downloading software update data and storing the downloaded software update data in the memory; after activating the update mode, deactivating the radio module and automatically uploading the stored software update data from the database to a connected measuring device.

According to a fourth aspect of the invention, a computer readable program product is provided, the computer readable program product comprising instructions which, when executed on a programmable circuit of a smart computer, cause the programmable circuit to be operated in a radio operation mode and in an update mode, which are configured to: wherein after activating the radio operation mode, connecting the smart computer to a software server via the radio module and the wireless interface, downloading software update data and storing the downloaded software update data in the memory; after activating the update mode, deactivating the radio module and automatically uploading the stored software update data from the database to a connected measuring device.

It is a finding of the present invention that the software of electronic devices, such as measuring devices, has to be updated from time to time. Further, there is a requirement that RF sensitive measuring devices for the purpose of updating their software may not be coupled to the Internet, either directly via a cable or indirectly via a wireless connection.

The idea of the present invention is to use a simple, conventional smart computer to update the software of RF sensitive measuring devices. For updating the software, this smart computer is running in two modes: In a first mode, firstly the update data for updating the software is downloaded, for example via a specially established radio connection to a server on which the software or software update data are stored. In a second mode, after having completely downloaded this software update data to the smart computer, this software update data is then transferred to the measuring devices via a wired connection which is established between the smart computer and the measuring device. Previously, if necessary, the radio connection to the server is interrupted.

This two-step update process is very simple and convenient and ensures a safe update in view of the RF sensitivity of the measuring device. In particular, the software update data can be very easily obtained by means of the smart computer and uploaded to the measuring device. A de-installation of the measuring device for the purpose of the update is no longer necessary. Also a manual, time-consuming downloading of the software update data to a data carrier and then uploading the software update data to the measuring device is no longer necessary. The entire update process turns out to be significantly easier.

Specific embodiments of the invention are set forth in the dependent claims.

These and other aspects of the invention will be apparent from and elucidated with reference to the embodiments described hereinafter.

BRIEF DESCRIPTION OF THE DRAWINGS

For a more complete understanding of the present invention and advantages thereof, reference is now made to the following description taken in conjunction with the accompanying drawings. The invention is explained in more detail below using exemplary embodiments which are specified in the schematic figures of the drawings, in which.

In all figures of the drawings elements, features and signals which are the same or at least have the same functionality have been provided with the same reference symbols, unless explicitly stated otherwise.

DETAILED DESCRIPTION OF THE EMBODIMENTS

Figure 1:
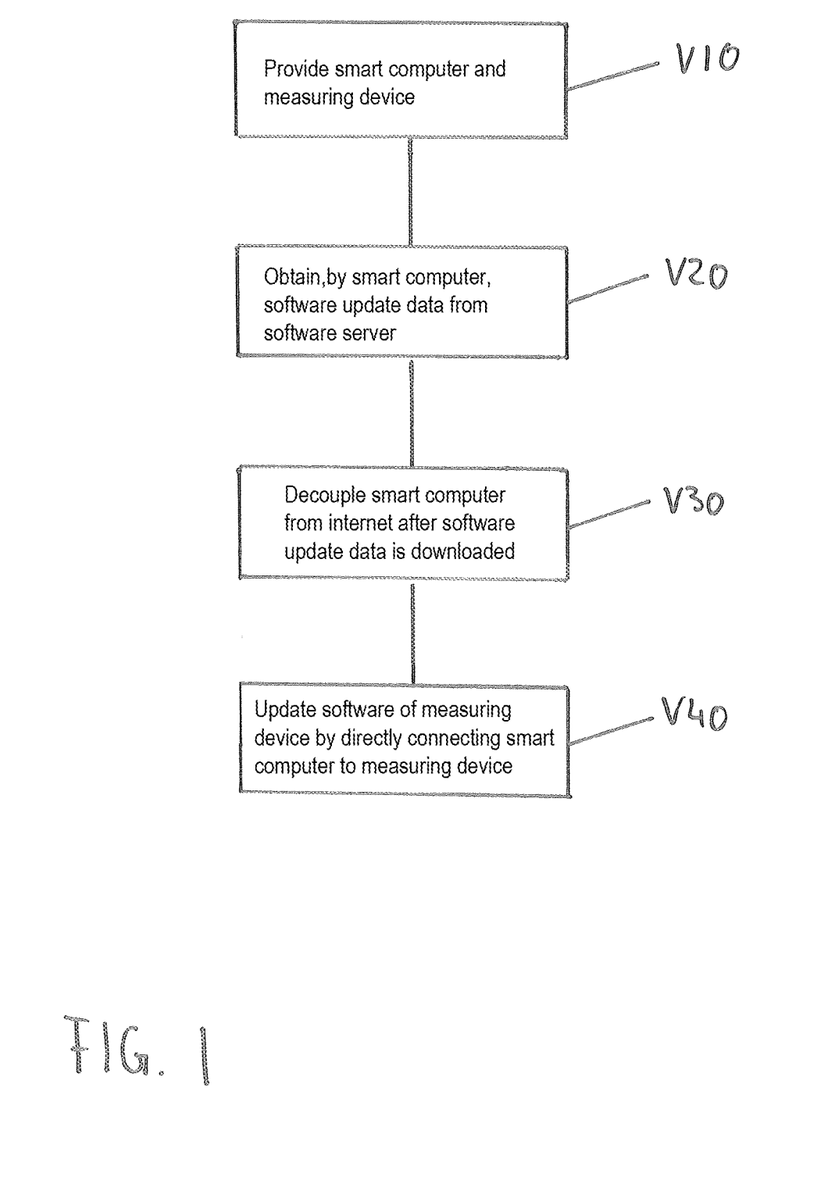
FIG. 1 schematically shows a flow diagram of a method for updating software of a measuring device in a RF sensitive environment according to an aspect of the invention.

FIG. 1 schematically shows a flow diagram of a method for updating software of a measuring device in a RF sensitive environment according to an aspect of the invention.

Firstly, a smart computer such as a smart phone having a radio operation mode for wireless communication and a measuring device are provided (step V10). The smart computer is having a radio operation mode for wireless communicating with other radio devices. The measuring device, which is RF sensitive, comprises system software for the operation of the measuring device. The system software may be firmware stored in the measuring device for the operation of the measuring device.

In an initial update step V20, software update data is obtained by the smart computer. The software update data is in particular downloaded from a software server to which the smart computer is wirelessly coupled through a radio connection. This software server may be a firmware server located at the site of the firmware provider.

Next in step V30, the smart computer is decoupled from the internet and thus from the software server after the software update data is downloaded completely. This may be done by bringing the smart computer in a non-radio mode, such as a flight mode in which the radio functionality is deactivated.

Finally, in step V40 the system software of the measuring device is updated. This updating step is performed by directly connecting the smart computer to the measuring device, e.g. by means of a USB- or LAN-connection, and afterwards by automatically uploading the software update data from the smart computer to the connected measuring device.

Figure 2A:
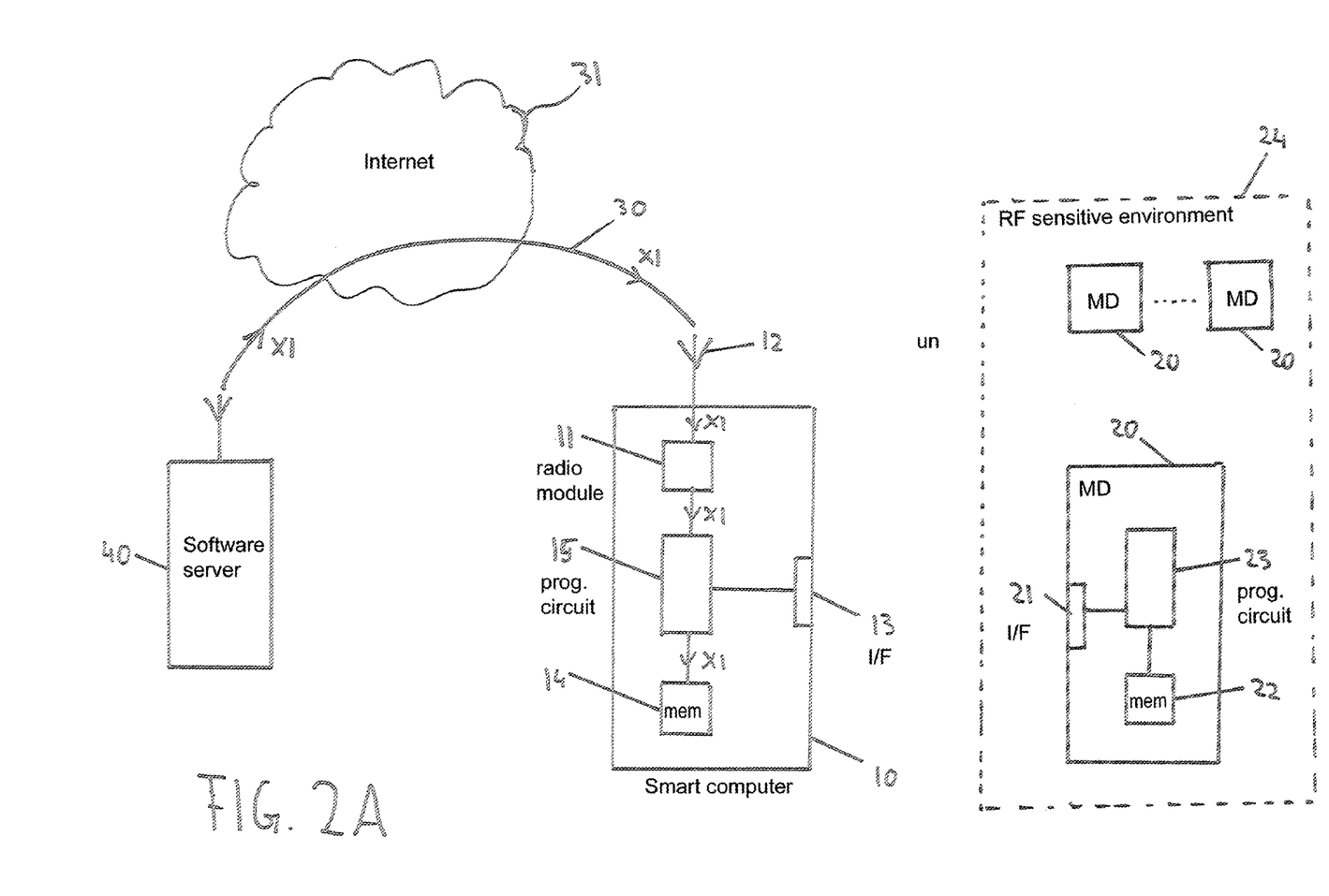
FIGS. 2A and 2B schematically show different arrangements of the measuring device and the smart phone for illustrating the method of FIG. 1.
Figure 2B:
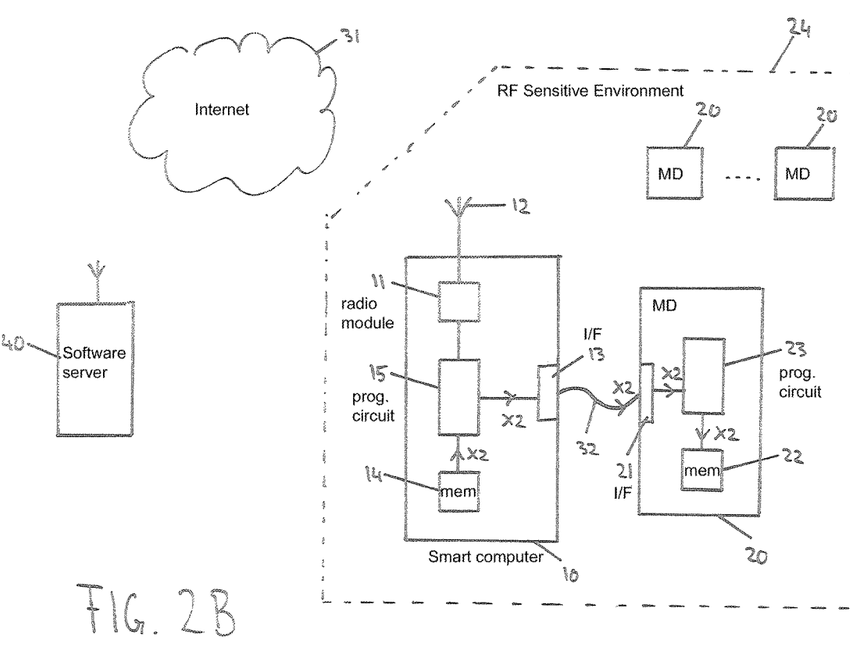

FIGS. 2A and 2B schematically show an arrangement of the measuring device and a smart phone for illustrating the method of FIG. 1.

The smart computer, which may be a smart phone, is noted by reference symbol 10. The smart computer 10 comprises a radio module 11 and a wireless interface 12 for wireless communication with other radio devices. The smart computer 10 further comprises a wired interface 13, an internal memory unit 14 and a programmable circuit 15. The programmable circuit 15 which is for example a microprocessor is configured to control operation of the smart computer 10. This programmable circuit 15 is operable in a radio operation mode and in an update mode which modes are specified in more detail below.

The measuring device 20 is RF sensitive. This measuring device 20 is for example a spectrum analyser, a RF signal generator, an oscilloscope, a network analyser for measuring RF parameters, a radio communication tester or the like. The measuring device 20 comprises an input interface 21, such as a USB plug 21, a memory unit 22 and a programmable circuit 23 such as a microprocessor. The measuring device 20 is arranged in a RF sensitive environment 24 in order to guarantee safe operation of the measuring device 20. This RF sensitive environment 24 is preferably shielded from noise and interference signals. Further, no radio transmitters should be located in the RF sensitive environment 24 so that harmful noise and interference signals are avoided as most as possible. In the present case, the RF sensitive environment 24 is a room or a hall in which a plurality of measuring device 20 are located.

In FIG. 2A, the smart computer 10 is located not in the proximity to the measuring devices 20. In particular, the smart computer 10 is located off-site the measuring devices 20, i.e. outside the RF sensitive environment 24. According to the example in FIG. 2A, the radio module 11 of the smart computer 10 is activated and the programmable circuit 15 is operated in the radio operation mode. This may be initiated for example by a specific software application within the smart computer 10. After activation of this radio operation mode, the programmable circuit 15 is establishing a wireless connection 30 to a software server 40 via the wireless interface 12 and the internet 31. Once the connection 30 is established, software update data X1 which is stored at and available from the software server 30 is downloaded and stored in a database of the internal memory unit 14 of the smart computer 10. The downloaded data X1 may be in the form of the complete software needed by the measuring device 20 or only update data thereof.

After having downloaded the software update data X1, the radio module 11 of the smart computer 10 is deactivated, e.g. by driving the smart computer 10 into the flight mode. The smart computer 10 is then transferred to the RF sensitive environment 24 in close proximity to one of the measuring devices 20.

FIG. 4B shows a scenario, where the smart computer 10 is connected to the measuring devices 20 via a connection line 32, such as a USB connection, between the wired interface 13 of the smart computer 10 and the input interface 21 of the measuring devices 20. After having activated the update mode, which may also be initiated through a specific software application, the programmable circuit 15 firstly checks whether the radio module is deactivated. Then, if the radio module 11 is deactivated, the programmable circuit 15 automatically uploads the stored software update data x2 from the internal memory unit 14 to the connected measuring device 20. The uploaded software update data x2 is stored in the memory unit 22 of the measuring device 20.

Figure 3:
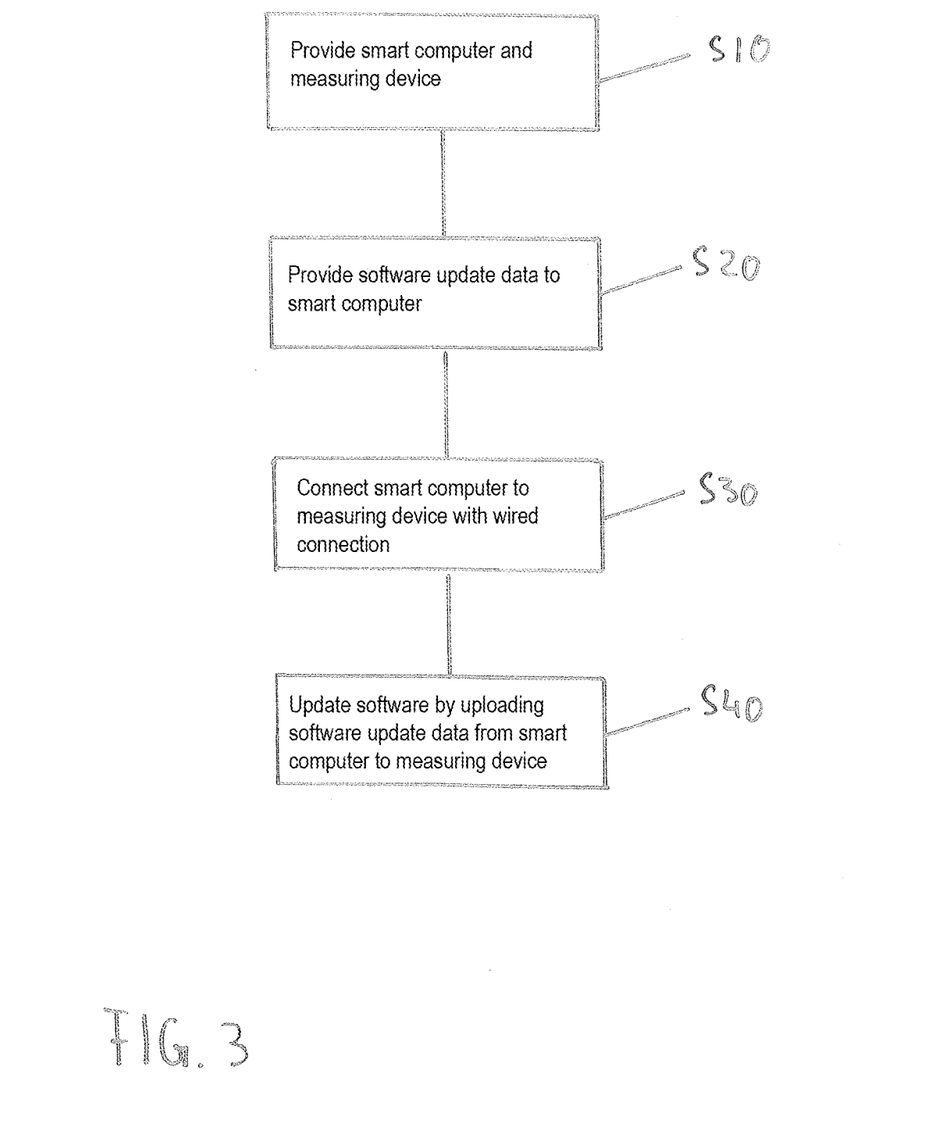
FIG. 3 schematically shows a flow diagram of a method for updating software of a measuring device in a RF sensitive environment according to a further aspect of the invention.

FIG. 3 schematically shows a flow diagram of a method for updating software of a measuring device in a RF sensitive environment according to a further aspect of the invention.

Initially, a smart computer such as a tablet PC without a radio operation mode and a measuring device are provided (step S10). The measuring device, which is RF sensitive, comprises system software for the operation of the measuring device.

In step S20, software update data is provided to the smart computer, e.g. by means of a data carrier or via a LAN-connection.

Afterwards in step S30, the smart computer is connected to the measuring device by means of a wired connection, e.g. a USB- or LAN-connection.

Finally, the software of the measuring device is updated (step S40) by automatically uploading the software update data from the smart computer to the connected measuring device.

Hereinafter some additional embodiments or preferable variations are explained:

According to one embodiment, the software is firmware and the software server is a firmware server. In electronic systems and computing, firmware denotes the combination of persistent memory and program code and data stored in it. Typical examples of devices containing firmware are embedded systems, such as measuring devices, computers, computer peripherals, etc. The firmware contained in these devices provides the control program for the device. Firmware is typically held in non-volatile memory units such as ROM, EPROM or flash memory.

According to one embodiment, the firmware server is a secured server which is located at the site of the firmware provider. This prevents that wrong or bugged firmware, that prompts the measuring device to work incorrectly, is available and downloaded. If firmware is upgradable, it is often done via a specific program from the firmware provider. Often the old firmware will be saved before upgrading, so it can be reverted to if the update or, upgrade process fails, or if the newer version does not work.

According to one embodiment, the smart computer comprises a software update application. This software update application is an application—or shortly App—which is configured to cause the smart computer to perform tasks. After activation the software update application is configured to automatically establish an electrical connection to the software server via the internet in order to download software update data and to automatically push the downloaded software update data to the measuring device. The latter step is performed unless the software update application identifies that the smart computer is decoupled from the Internet and connected to the measuring device.

According to one embodiment, the radio operation mode of the smart computer is deactivated during updating the software. In particular, the smart computer is operated in an airplane mode during updating the software. Airplane mode denotes a setting available on mobile phones, smartphones and other smart electronic devices that, when activated, suspends the device's signal transmitting functions, thereby disabling the device's capacity to place or receive calls or use text messaging—while still permitting use of other functions that do not require radio function and signal transmission.

According to one embodiment, the smart computer is not in the proximity of the measuring device during updating the software. In particular, during updating the software the smart computer is off-site the RF sensitive environment in which the measuring device is arranged. In computing, off-site is the strategy of communicating out of the main location (off the main site) of the RF sensitive measuring devices or their environment in order to prevent any damaging or destructive impacts.

According to one embodiment, the smart computer is a smart phone, a PDA or a tablet computer. A smart phone (or smartphone) is a mobile phone with more advanced computing capability and connectivity than basic cell phones. A personal digital assistant (PDA) is a mobile device that functions as a personal information manager. A tablet computer, or simply tablet, is a mobile computer with display, circuitry and battery in a single unit. Tablets may also be equipped with radio modules in order to provide radio operation. Preferably, the smart computer is a portable, mobile device.

According to one embodiment, the measuring device is an equipment which is configured to measure RF parameters, such as the frequency, frequency spectrum, frequency spread, frequency response, frequency characteristic, etc.

According to one embodiment, the measuring device is at least one of: a frequency meter, a shielding device, a spectrum analyzer, a signal generator, an oscilloscope, a radio communication tester or a network analyzer for measuring RF parameters.

According to one embodiment, the smart computer and the measuring device are wired connected for updating the software. This connection may be a USB (universal serial bus) connection or LAN (local area network) connection. USB is a very comfortable standardized serial bus connection that defines the cables, connectors and communications protocols used in a bus for connection, communication and power supply between computers and electronic devices. With the USB protocol, a high data transfer rate can be achieved with relatively little effort.

According to one embodiment, the smart computer comprises a database which is configured to receive and manage a plurality of different software update data. Thus, the smart computer is capable to receive and store software (or firmware) update data for a plurality of different devices.

According to a particular embodiment, after having connected the smart computer to the measuring device, the smart computer is configured to identify the connected measuring device and the corresponding software used by the measuring device, to select the corresponding software update data from the data-base, to establish a communication channel to the connected smart computer and to upload (or push) the selected software update data to the measuring device.

According to another embodiment, after connecting the smart computer to the measuring device, the measuring device is configured to identify the connected smart computer and the corresponding software update data stored in the database, to establish a communication channel to the connected smart computer and to automatically upload the software update data from connected smart computer.

According to one embodiment, during updating the software the software update data is uploaded automatically from the smart computer to the connected measuring device.

According to one embodiment, during updating the software, the smart phone is configured to analyze the software used by the measuring device and to automatically upload to the measuring device those software update data stored in the database which suits best to the analyzed software.

According to one embodiment, after having uploaded the software update data completely to the measuring device, a status signal is automatically sent to the software provider, e.g. once the smart computer is in the radio mode the next time. This status signal comprises information of the software updating, such as type, volume, content and/or transmission time of the uploaded software update data.

According to one embodiment, the smartphone and/or the measuring device receives a reminder signal indicating that a next software update process should be initiated. Typically, this reminder signal is sent by the software provider. Alternatively, this reminder signal is implemented in the software of the smartphone or the measuring device software. Preferably, the reminder signal is sent after a predetermined time the last software update process.

According to one embodiment, the smart computer receives an indication signal from the software provider if an upgrade of the software (or the firmware) is available for being downloaded.

According to one embodiment, providing software update data is done by wireless or wired connecting the smart computer to a software server which comprises the software update data or by using a data carrier which comprises the software update data.

The programmable circuit may, for example, be or comprise a microprocessor or microcontroller. Such a programmable circuit may be employed in a processing device, for example a central processing unit (CPU) and/or a coprocessor and/or a digital signal processor and/or an embedded processor. The programmable circuit may for instance include one, or more, processor cores which can execute the instructions in a memory connected to the processor core. The processor cores may for instance include the logic circuitry required to execute program code in the form of machine code. The processor cores may for instance at least include an instruction decoder, an arithmetic unit, an address generation unit, and a load/store unit. The programmable circuit may for example include, in addition to the processor core, inputs/outputs or other components, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components.

The term instruction may be understood to denote an operation of a programmable circuit or processing unit within a computer system. The term command may be understood to refer to a directive to a computer program acting as an interpreter in order to perform a specific task.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that elements in the figures are illustrated for simplicity and clarity and have not necessarily drawn to scale. For example, the chosen elements are only used to help to improve the understanding of the functionality and the arrangements of these elements in various embodiments of the present invention. Also, common but well understood elements that are useful or necessary in a commercial feasible embodiment are mostly not depicted in order to facilitate a less abstracted view of these various embodiments of the present invention. It will further be appreciated that certain actions and/or steps in the described methods may be described or depicted in a particular order of occurrences while those skilled in the art will understand that such specificity with respect to sequence is not actually required. It will also be understood that the terms and expressions used in the present specification have the ordinary meaning as it accorded to such terms and expressions with respect to their corresponding respective areas of inquiry and study except where specific meanings have otherwise be set forth herein.

LIST OF REFERENCE SIGNS 10 smart computer
11 radio module
12 wireless interface
13 wired interface
14 internal memory unit
15 programmable circuit
20 measuring device
21 input interface
22 memory unit
23 programmable circuit
24 RF sensitive environment
30 wireless connection
31 internet
32 connection line
40 software server
S10-S40 steps
V10-V40 steps
X1 downloaded software update data
X2 uploaded software update data

What is claimed is:

1. A method for updating software of a radio frequency (RF) sensitive measuring device in an RF sensitive environment, the method comprising:
providing a smart computer outside the RF sensitive environment and having a radio operation mode for wireless communication and providing the RF sensitive measuring device in the RF sensitive environment that comprises software for operation of the measuring device;
downloading software update data from a software server by wireless coupling the smart computer to the software server via internet;
decoupling the smart computer from the internet after the software update data is downloaded; and
updating the software of the RF sensitive measuring device by directly connecting the smart computer to the RF sensitive measuring device via a wired connection and by uploading the software update data from the smart computer to the connected RF sensitive measuring device, wherein the RF sensitive measuring device is at least one of: a spectrum analyzer, an oscilloscope, radio communication tester or a network analyzer for measuring RF parameters.

2. The method of claim 1, wherein the software is firmware and the software server is a firmware server.

3. The method of claim 2, wherein the firmware server is a secured server which is located at a firmware supplier.

4. The method of claim 1, wherein the smart computer comprises a software update application which after being activated is configured to:
automatically establish an electrical connection to the software server via the Internet; and
automatically push the downloaded software data to the RF sensitive measuring device after the smart computer is decoupled from the Internet and connected to the RF sensitive measuring device.

5. The method of claim 1, wherein the smart computer is operated in an airplane mode during updating the software.

6. The method of claim 1, wherein the smart computer is off-site of the RF sensitive environment during updating the software.

7. The method of claim 1, wherein the smart computer is a smart phone, personal digital assistant (PDA) or a tablet computer.

8. The method of claim 1, wherein the RF sensitive measuring device is an equipment which is configured to measure RF parameters.

9. The method of claim 1, wherein the smart computer and the RF sensitive measuring device are connected via a wired universal serial bus (USB) connection or wired local area network (LAN) connection for updating the software.

10. The method of claim 1, wherein the smart computer comprises a database which is configured to receive and manage a plurality of different software update data.

11. The method of claim 10, wherein after connecting the smart computer to the RF sensitive measuring device, the smart computer is configured to identify the connected RF sensitive measuring device and the corresponding software used by the RF sensitive measuring device, to select the corresponding software update data from the database, to establish a communication channel to the connected smart computer and to upload (push) the selected software update data to the RF sensitive measuring device.

12. The method of claim 10, wherein after connecting the smart computer to the RF sensitive measuring device, the RF sensitive measuring device is configured to identify the connected smart computer and the corresponding software update data stored in the database, to establish a communication channel to the connected smart computer and to automatically upload the software update data from connected smart computer.

13. The method of claim 10, wherein during updating the software, the smart computer is configured to analyze the software used by the RF sensitive measuring device and to automatically upload the software update data stored in the database to the RF sensitive measuring device which best suits the analyzed software.

14. The method of claim 1, wherein after having uploaded the software update data completely to the RF sensitive measuring device, a status signal is automatically sent to a software producer, the status signal comprising information of the software updating.

15. The method of claim 1, wherein the smart computer or the RF sensitive measuring device receives a reminder signal indicating that a next software update process should be initiated.

16. The method of claim 1, wherein the smart computer receives an indication signal from a software provider if an upgrade of the software is available.

17. A method for updating software of a radio frequency (RF) sensitive measuring device, the method comprising:
providing a smart computer outside of an RF sensitive environment and providing the RF sensitive measuring device in a RF sensitive environment and that comprises software for operation of the RF sensitive measuring device;
providing software update data to the smart computer by downloading from a software server the software update data via internet;
decoupling the smart computer from the internet after the software update is downloaded;
connecting the smart computer to the measuring device by means of a wired connection; and updating the software of the RF sensitive measuring device by uploading the software update data from the smart computer to the connected RF sensitive measuring device, wherein the RF sensitive measuring device is at least one of: a spectrum analyzer, an oscilloscope, radio communication tester or a network analyzer for measuring RF parameters.

18. The method of claim 17, wherein providing software update data is performed by connecting the smart computer to the software server which comprises the software update data or by using a data carrier which comprises the software update data.

19. A smart computer, comprising:
a radio module for wireless communication;
a wired interface and a wireless interface;
a memory;
  a programmable circuit which is operable in a radio operation mode and in an update mode, wherein the programmable circuit is configured to:
  after activating the radio operation mode, connecting the smart computer to a software server via the radio module and via the wireless interface, downloading software update data from the software server via internet and storing the downloaded software update data in the memory; and
  after activating the update mode, deactivating the radio module, thereby decoupling the smart computer from the internet and automatically uploading the stored software update data from the memory to a connected radio frequency (RF) sensitive measuring device via the wired interface, wherein the RF sensitive measuring device is at least one of: a spectrum analyzer, an oscilloscope, radio communication tester or a network analyzer for measuring RF parameters.

20. A non-transitory computer readable medium storing instructions which, when executed on a programmable circuit of a smart computer, cause the programmable circuit to be operated in a radio operation mode and in an update mode, which are configured to:
  wherein after activating the radio operation mode, connecting the smart computer to a software server via a radio module and a wireless interface;
  downloading software update data from the software server via internet and storing the downloaded software update data in a memory; and
  after activating the update mode, deactivating the radio module, thereby decoupling the smart computer from the internet, and automatically uploading the stored software update data from the memory to a connected radio frequency (RF) sensitive measuring device via a wired connection, wherein the RF sensitive measuring device is at least one of: a spectrum analyzer, an oscilloscope, radio communication tester or a network analyzer for measuring RF parameters.

* * * * *